United States Patent
Hassan et al.

[11] Patent Number: 5,914,942
[45] Date of Patent: Jun. 22, 1999

[54] SATELLITE COMMUNICATIONS SYSTEM WITH DUAL MODE BANDWIDTH CONTROL

[75] Inventors: Amer A. Hassan; Stanley L. Reinhold; Nils Rutger Rydbeck, all of Cary, N.C.

[73] Assignee: Ericsson Inc., Research Triangle Park, N.C.

[21] Appl. No.: 08/736,954

[22] Filed: Oct. 25, 1996

[51] Int. Cl.[6] .................................................. H04B 7/185
[52] U.S. Cl. ........................................ 370/316; 455/12.1
[58] Field of Search ..................................... 370/316, 343, 370/344, 319, 310; 455/552, 553, 68, 12.1, 427

[56] References Cited

U.S. PATENT DOCUMENTS

| | | | |
|---|---|---|---|
| 4,870,642 | 9/1989 | Nohara ........................................ | 370/75 |
| 5,291,516 | 3/1994 | Dixon .......................................... | 375/1 |
| 5,526,404 | 6/1996 | Wiedeman et al. ........................ | 379/60 |
| 5,625,877 | 4/1997 | Dunn et al. ............................... | 455/454 |

FOREIGN PATENT DOCUMENTS

| | | |
|---|---|---|
| 0 719 062 A2 | 12/1995 | European Pat. Off. . |
| 1-146435 | 6/1989 | Japan . |
| WO 92/21195 | 11/1992 | WIPO . |

OTHER PUBLICATIONS

Baranowsky, P.W., "MSAT and Cellular Hybrid Networking", proceedings of the International Mobile Satellite Conference, Jan. 1, 1993.

*Primary Examiner*—Michael Horabik
*Assistant Examiner*—Kevin C. Harper
*Attorney, Agent, or Firm*—Jenkens & Gilchrist, P.C.

[57] ABSTRACT

A satellite-cellular communication system includes a satellite based transceiver for transceiving two-way communications originated at a user terminal. As a part of call set up, a controller determines whether the user terminal should transmit in the uplink in either a wide band mode of operation or in a narrow band mode of operation. The controller then specifies to the user terminal the mode of operation through the transceiver.

Whether the user terminal transmits in the uplink in a wide band or in a narrow band mode depends upon factors including the type of device, channel usage and efficiency in the channels to and from the satellite transceiver and the signal quality of the signals received at the transceiver.

6 Claims, 2 Drawing Sheets

SATELLITE COMMUNICATIONS SYSTEM WITH DUAL MODE BANDWIDTH CONTROL

BACKGROUND OF THE INVENTION

1. Technical Field of the Invention

The present invention relates to a communications system operable to carry communication signals between satellite transceivers and earth based transceivers, and, in particular, to a system including transceivers operable to communicate with a selected one of two or more carrier protocols used in various types of cellular communications systems.

2. Description of Related Art

Terrestrial cellular communications systems are now commonly available for subscriber use in most of the major urban areas of the world. However, in spite of the success of such systems and the increasing demand for expanded coverage, there remain areas of the world where terrestrial cellular communications systems do not present a commercially viable communications option. For example, rural areas with low population densities do not offer a substantial enough potential subscriber base to justify the cost of installing a terrestrial cellular communications system infrastructure. Notably, these rural areas sometimes lack conventional wireline (fixed) telephone service for the same economic reasons.

There also exist capacity concerns with respect to existing terrestrial cellular communications systems. The dramatic success and acceptance of this form of communications has led to increased subscription growth. With more and more users, some existing terrestrial cellular communications systems have become overloaded during peak use times. While the demand justifying expansion is present, some service providers have been slow to respond to increasing demand and have not made expanded or made plans to expand the existing infrastructure to support the new demand. In some instances, governmental restrictions have hampered effective service provider response to increases in demand. In other instances, the development of terrestrial cellular technologies for handling the increased demand for cellular services has not produced the promised results as quickly as had been hoped.

The foregoing concerns have contributed towards the development of satellite cellular communications systems. Such systems rely on communications satellites placed in orbit above the surface of the earth to relay telephonic communications between cellular devices capable of originating or terminating two-way communications (also referred to as "user terminals") with satellite based transceivers. One benefit, from both a service and cost perspective, provided by a satellite cellular communications system is that a single satellite is capable of servicing the communications needs of many users distributed over a substantial service area including both rural and urban areas. In fact, one satellite may be capable of providing communications service throughout an entire country. Satellites are further capable of providing communications service in remote areas of the world where installation of conventional terrestrial cellular and wireline communications system infrastructure is difficult if not impossible.

While satellite based communication systems may solve problems related to providing communication services in remote areas, it is generally accepted that it is preferable to use a terrestrial network if one is available. Reasons for this relate primarily to service quality. Terrestrial cellular communications systems and the satellite cellular communications system, however, operate in accordance with different protocols and communications standards. Furthermore, many types of terrestrial cellular communications systems exist, again each operating in accordance with different communications standards and protocols. Thus, for example, a subscriber wishing to access and use the Asia Cellular Satellite (ACeS) or SATCOM type satellite cellular communications system must possess and utilize a mobile station configured for operation in accordance with the ACeS communications standard. If that same subscriber wanted to access and use the Global System for Mobile (GSM) communications type terrestrial cellular communications system, their mobile station must be configured for operation in accordance with the GSM communications standard. Similarly, the mobile station must be appropriately configured for operation in any other desired terrestrial or satellite cellular communications system (such as, an I-CO type satellite cellular communications system, or the Advanced Mobile Phone System (AMPS or D-AMPS) type or Personal Communications System (PCS) type terrestrial cellular communications systems).

Recent developments in mobile station design have made multi-mode mobile stations available for subscriber use. Such multi-mode devices are capable of being configured for operation in any selected one of two or more available cellular communications system types. For example, the mobile station may be configured for operation in one mode in accordance with the GSM communications standard, and in another mode in accordance with the PCS communications standard.

With the advent of satellite cellular communications systems, increasing numbers of mobile stations are capable of operation in one of the terrestrial cellular communications systems, such as GSM, and one of the satellite cellular communications systems, such as ACeS. Access to such a mobile station, in conjunction with the placement into operation of both terrestrial and satellite cellular communications systems, advantageously provides the subscriber with access to communications services substantially throughout the entire world.

Currently, a mobile station or other system operable to originate or terminate two way communications with satellite based transceivers (collectively "user terminal" or "UT") receives wide band downlink signals and transmits narrow band uplink signals. Narrow band is defined herein as being 50 kilohertz or less and wide band is defined as 200 kilohertz or greater. While some of the dual purpose user terminals described above are capable of wide band communications with terrestrial networks, by way of example, GSM, they are designed to communicate with satellite transceivers in a narrow band when operating as a user terminal. A reason that mobile stations functioning as a user terminal cannot transmit to a satellite based transceiver in a wide band is that legal regulations preclude the average transmission power level for mobile stations above a specified amount. This specified amount is a value which does not allow wide band transmission which are sufficiently strong to reach a satellite receiver. A mobile station operating as a user terminal must, therefore, transmit in an uplink to a satellite transceiver in a narrow band mode to increase the average power of the transmitted signals. The narrow band mode of transmission is necessary so as to overcome the significant amount of attenuation due to the atmosphere and distance to the transceiver. Additionally, even without the legal restrictions, the limited power of a mobile station precludes wide band transmissions with sufficient power to reach a satellite sufficiently clearly.

Currently, many existing user terminals transmit in an uplink to the satellite transceiver at a very narrow bandwidth, namely 5 kilohertz. Examples of user terminals that currently transmit in such a narrow bandwidth for the uplink portion of the two way communications include mobile stations, automobile installed communication devices, and even large roof mounted communication devices used by shopping malls, high rise buildings, hospitals, etc.

While user terminals originate or terminate a communication signal with a satellite transceiver transmit in a narrow band mode in the uplink, land earth stations (LES) are designed to transmit in an uplink in a wide band mode of operation. This is important because LES's are operable as an interface between a satellite transceiver and a terrestrial communication system and have high throughput requirements.

Despite the fact that current user terminals all transmit in a narrow band uplink, it is advantageous for a user terminal to communicate with a satellite transceiver in the uplink in a wide band mode in many cases. Because satellite transceivers communicate in a down link in a wide band mode, communication balance and symmetry may be better achieved if communication links on the uplink also are in a wide band communication mode. Such balance simplifies communication timing problems in certain situations and improves overall communication performance. Current user terminals are not designed, however, to communicate with satellite transceivers in a wide band mode of operation.

Even if a user terminal is designed to transmit in a wide band mode in an uplink to a satellite transceiver, it is preferable in some situations for the user terminal to transmit in a narrow band mode for the uplink.

One situation in which it might be advantageous for a communication device to transmit in a narrow band mode in the uplink, for example, is to improve signal reception quality by the satellite transceiver. Signal reception quality may be enhanced by reducing the data rate to increase the average amount of power for a defined signal quantity. For some communication systems, by way of example, a satellite communication system, it is known that signal path attenuation is sufficiently large that a mobile station is required to communicate in a narrow band communication mode for the signal to reach the satellite transceiver.

Stellar communication networks typically include a controller for channel management. Because such a controller is usually designed to allocate channels in an efficient manner as a part of its channel management, the controller is adapted to determine what communication links are available and to assign the channels as needed. Given the continuing need for limited carrier resources, however, there may be times in which it is desirable for a user terminal capable of communicating in wide band to be set up for communication on a narrow band carrier. By way of example, if the only available carrier (or channel) is a narrow band carrier, an earth based station which is adapted for wide band communication would be denied access until such a time that it attempts to establish a communication link and a wide band channel is available. There is a present need, therefore, for a user terminal that is capable of selectively communicating with a satellite transceiver in a narrow band mode or in a wide band mode of communications. There is also a need for communication control systems, in general, to selectively control the communication protocol and bandwidth used by the earth station for its uplink either to a base station or to a satellite transceiver.

SUMMARY OF THE INVENTION

To address the needs described above, a system is provided for communicating with a satellite on an uplink in either a wide band or narrow band mode. Additionally, S a controller is provided for transmitting control signals and for controlling the type of communication transmissions produced by a user terminal on an uplink (return link). The controller sends control commands to the user terminal to instruct it as to which carrier channel it is to use and whether it is to communicate in a wide band or in a narrow band mode of operation. The user terminal receives the instructions from the control device and is responsive thereto. More specifically, the user terminal will, in accordance with the control instructions, select a channel for communicating and will use the either wide or narrow band mode of communication. The wide band mode is typically characterized by a 200 kilohertz carrier spacing while the narrow band is typically characterized by a 50 kilohertz carrier spacing.

The controller is also operable to communicate with a telemetry monitoring device which monitors communications within the satellite network to determine transport usage and efficiency of the various communication links established between land earth stations, user terminals and a specified satellite. Based upon information provided by the telemetry monitoring device, the controller selects channels and modes of operation to increase transport efficiencies, or in some cases, merely to allow a device to communicate upon a narrow band in the event that a wide band channel is not available. Because the system includes the capability of instructing a wide band capable transmitter to transmit in a narrow band, overall communication efficiency is increased and system performance is enhanced. Moreover, having a selectable transmission mode as defined herein allows the system to transmit in a narrow band to overcome other system constraints. For instance, if two or more land earth stations are communicating through a satellite, timing constraints may require a longer data burst for system synchronization purposes, in order to improve overall system performance.

A user terminal is also provided for receiving specified control commands over a control channel from a controller. The user terminal selects its mode and channels of communication responsive to the specified control commands.

A land earth station (LES) is provided for transporting two way communications originated by a telephony device. By way of example, the LES may transport communication signals originated either by a telephone coupled to the public switched telephone network or by a mobile station. More specifically, the LES is adapted to receive wide band communication signals having a 200 kilohertz band width and to transmit those signals to a satellite transceiver also at 200 kilohertz.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
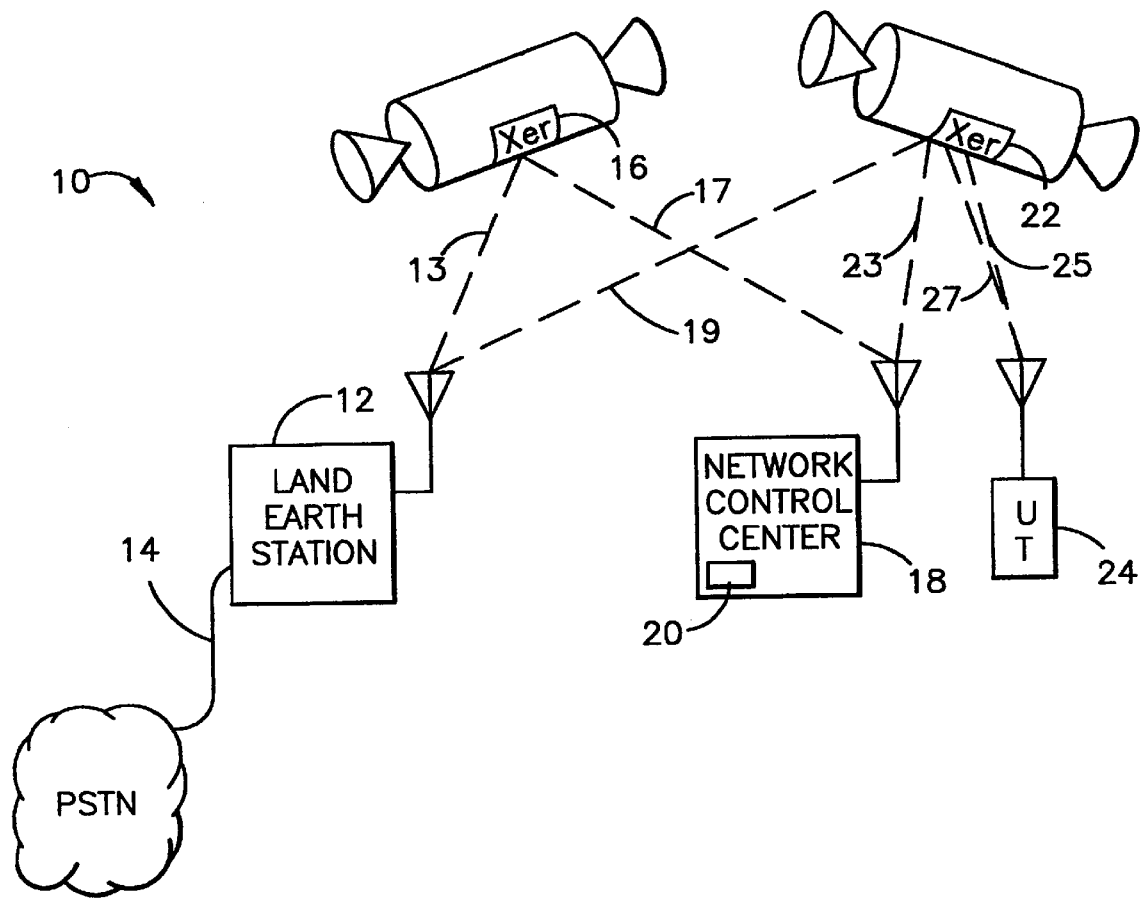
FIG. 1 is a block diagram of a first communications system including terrestrial and stellar cellular communications networks.

Referring to FIG. 1, a satellite-cellular communication system, shown generally at 10, includes the circuitry, and associated methodology, of an embodiment of the present invention. It should be noted at the outset that, while the communication system 10 is illustrated to be a satellite-cellular communication system, the present invention can analogously be embodied in a terrestrial-cellular, or other radiotelephonic, communication system. For instance, as one skilled in the art shall appreciate, by appropriate substitution of terrestrial-based base stations for certain of the satellite-based transceivers of a satellite-cellular communication system, a terrestrial-cellular communication system can instead be formed.

The communication system 10 includes a land Earth station 12 which is coupled, here represented by lines 14, to a public service telephone network ("PSTN"). The land Earth station 12 includes transceiver circuitry for transceiving communication signals, inter alia, with a satellite-based transceiver 16 over a communication link 13.

The satellite-based transceiver 16 is operable to transceive communication signals not only with the land Earth station 12 but also with other land-based devices, such as transceiver circuitry of a network control center 18. The transceiver 16 is primarily operable to relay signals generated at the land Earth station 12 to the network control center 18 over a communication link 17 and vice-versa. The transceiver is preferably able to receive signals on any frequency channel and relay the signal on another frequency channel.

The transceiver circuitry of the network control center 18, in turn, is able to transceive communication signals with other satellite-based transceivers, such as transceiver 22 over communication link 23. Satellite based transceiver 22, similar to transceiver 16, is able to transceive communication signals with land-based transceivers including, for example, to a user terminal 24 over a communication link 25. Analogous to the transceiver 16, the transceiver 22 is primarily operable to relay signals transmitted thereto. Thus, user terminal 24 is operable to transmit communication signals over a communication link 27. The transceiver circuitry of the illustrated devices each include a plurality of transceiving elements to permit concurrent communication between large numbers of communication stations.

Communication pursuant to a satellite-cellular communication system, such as the system 10 shown in FIG. 1, permits a user of a user terminal, such as user terminal 24, to communicate telephonically when positioned at any location throughout large areas of the world. As long as the user of the user terminal 24 is positioned to permit transmission and reception of communication signals with a satellite-based transceiver, such as one of the transceivers 16 and 22, the user is able to communicate telephonically with a user of another user terminal or to a telephonic device of a conventional, wireline network. Because of the almost-worldwide scope permitted of a satellite-cellular communication system, the user of the user terminal 24 is able to communicate with the transceiver 16 independent of whether user terminal 24 can communicate with a local cellular system. The user is capable, therefore, of communicating telephonically in an area which does not otherwise have an installed cellular, or wireline, telephonic network.

For instance, when the land Earth station 12 (i.e., a telephone device coupled thereto) attempts to transmit a call initiated with the PSTN to user terminal 24, an indication of the initiation is provided to the network control center 18 by way of the transceiver 16. The network control center generates control signals, which are provided to the terminal 24 by way of the transceiver 22 and to LES 12. Once a call set-up is successfully completed, voice channels between the land Earth station and the user terminal are defined to permit two-way communication between the land Earth station and the user terminal, by way of the transceiver 22.

As mentioned previously, supervisory and control signals must first be sent to the terminal when a call is being placed to or from a user terminal. In the case of an incoming call to a user terminal, such signals are transmitted to inform the user terminal of the incoming call and to cause the user terminal to be tuned to transceive communication signals pursuant to such call. Included among the supervisory and control signals transmitted to the user terminal is a paging signal to alert the user terminal of the incoming call. When the user terminal is paged, the user terminal might not be positioned to receive the paging signal. The paging signal must be repeated in such instances so that the user terminal receives the paging signal. If the link margin is increased to deliver the message, the paging signal includes, in one embodiment, a signal specifying that the link margin requires increasing in the return signals, e.g., the acknowledgment signal. Accordingly, Controller 18 aware of transmission difficulties uses such information in selecting wide or narrow band modes of communication for the user terminal's uplink.

Continuing to refer to the system of FIG. 1, land earth station (LES) 12 is operable to communicate with transceiver 16 in a wide band mode (200 kilohertz). UT 24, however, is operable to communicate with transceiver 22 either in a wide band made or a narrow band baud (50 kilohertz). As LES 12 communicates with network control center (controller) 18 to set up a communication link, controller 18 communicates with telemetric monitoring station 20 to determine system data channel efficiencies and usage. Controller 18 determines whether UT 24 is to communicate in a wide band or narrow band mode as well as what carrier or frequency band UT 24 is to use on the uplink. To illustrate, controller 18 may determine that UT 24 is to communicate with transceiver 22 over a specified channel in communication link 27 in a wide band mode. How controller actually determines which channel or carrier is to be used is known to those skilled in the art. Controller 18 then transmits a control signal over a specified control channel to UT 24 over communication links 23 and 25. The control signal specifies which channel and whether UT 24 is to use a wide band or narrow band mode of operation.

Controller 18 determines whether a user terminal, in this example UT 24, should use a wide band or a narrow band mode of communication by analyzing several factors. One factor is the type of user terminal. For certain devices, a narrow band is required due to peak power level restrictions or limitations for the device. By way of example, user terminals are typically limited to 2 watts of peak power. In wide band communications, the user terminal is limited to 2 watts/20 users=0.1 watts/user. In narrow band communications, however, the user terminal is limited to 2 watts/5 users=0.4 watts/user. Because 0.1 watts is not enough power to ordinarily reach a satellite or transceiver 16 while 0.4 watts is enough, controller 18 will direct a user terminal to transmit to a satellite transceiver, e.g., transceiver 16 or 22 in a narrow band mode even if user terminal 24 is capable of wide band communication with other networks such as GSM networks.

A second factor used by the controller is signal communication quality. If transceiver 22 sends a control signal to controller 18 indicating that it is receiving poor signal quality from user terminal 24, controller 18 may direct user terminal 24 to use a narrow band. By using a narrow band, a link margin of the transmitted signals may be increased as the average power per signal is increased thereby increasing signal quality.

Similarly, if communication quality is low due to timing or signal synchronization delays owing, in part, to propagation delays remitting from large signal travel distances, the timing problems may be reduced or eliminated by switching a wide band signal to a narrow band wherein a guard time between signals is diminished to a much smaller percentage of overall signal period. A guard time is a period of non-use between transmission bursts used to facilitate system synchronization.

A third reason a controller might instruct a wide band capable transmitter, by way of example LES 12, to transmit in a narrow band is related to channel usage. If controller 12 determines from communicating with telemetric device 20 that the only or best available channel is a narrow band channel for the uplink, then controller 18 instructs UT 24 to communicate in a narrow band mode over the specified narrow band channel.

Figure 2:
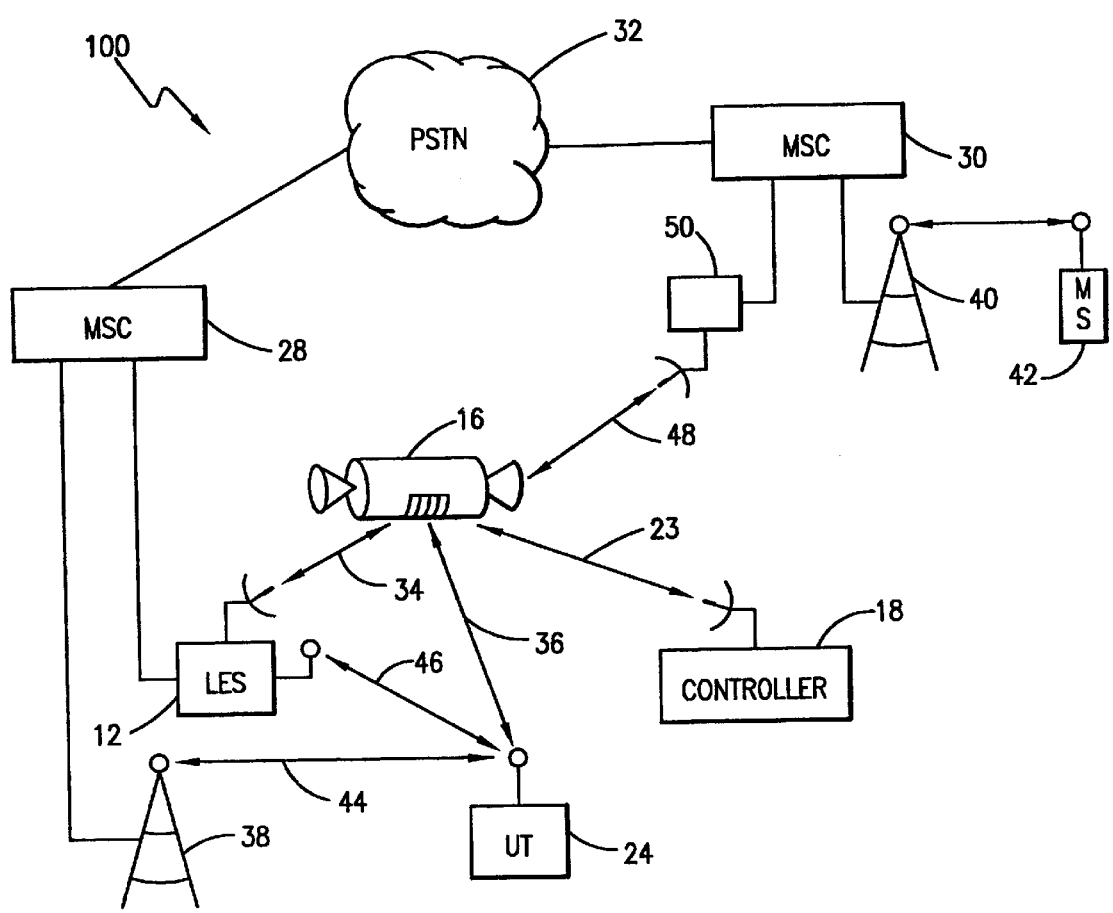
FIG. 2 is a block diagram of a second communications system including terrestrial and stellar communications networks.

Reference is now made to FIG. 2 wherein there is shown a block diagram of a communications system 100 including a transceiver 16 and mobile switching centers (MSCs) 28 and 30. A land earth station 12 connected to a mobile switching center (MSC) 28 which connects the LES 12 to the public switched telephone network (PSTN) 32. The communications system 100 includes a plurality of transceivers 16 (only one shown) positioned in orbit above the surface of the earth. The LES 12 communicates with the transceiver 16 via a communications link 34. Transceiver 16 communicates with user terminal 24 over a radio frequency communications link 36. Transceiver 16 accordingly functions to relay telephone communications (and related control signals) between the LES 12 and user terminal 24 over the communications links 34 and 36. MSC 28 is operable to switch calls generated by telephony sources, e.g., PSTN 32 or MSC 30 to LES 12 to transmit communication signals to transceiver 16 and to other user terminals, by way of example, to user terminal 24. Operation of the satellite cellular communications system 30 in this fashion is well known to those skilled in the art, and thus further description will not be provided.

Communications systems 100 includes a plurality of base stations (BS) 38 and 40 (only two shown) for transmitting telephone communications (and related control signals) with mobile station 42 over a radio frequency communications link 44. BS 40 is connected through mobile switching center (MSC) 30 to other mobile switching centers (not shown) within the cellular communications system 100. MSC 30 routes within communications systems 100 calls from other portions of the communications system 100. For instance, calls originated by or terminated at mobile station 42 may be routed to user terminal 24 through MSC 30, PSTN 32, MSC 28, LES 12, and transceiver 16, respectively. Operation of the communications systems 100 in this fashion is well known to those skilled in the art, and thus further description will not be provided.

While communications system 100 is illustrated as having only two base stations 38 and 40, it will, of course, be understood that such systems would typically include many more base stations, and that the depiction of only two base stations is to be taken as an illustration of, rather than a limitation on, the operation of the present invention. It will further be understood that although only two mobile switching centers 28 and 30 are shown to simplify the illustration, it will be understood that such systems typically will include many mobile switching centers interconnected to each other (perhaps through the PSTN 32), with each mobile switching center being connected to a plurality of base stations 38 and 40. Finally, communications systems 100 typically include many mobile stations 42 operating therein at any one time. The depiction of one mobile station 42 is to be taken as an illustration of, rather than a limitation on, the operation of the present invention.

Continuing to refer to system 100 of FIG. 2, user terminal 24 is operable to communicate with BS 38 over communication link 44. If, by way of example, MSC 28 and BS 38 are part of a GSM cellular communication network, then UT 24 communicates in a wide band mode over communication link 44 whenever user terminal is operable as a mobile station in the GSM network. User terminal 24 is also capable of communicating with transceiver 16 in a wide band mode over communication link 36 if user terminal is a type of communication device other than a mobile station. Regardless of whether user terminal 24 is a mobile station, however, it is capable of communicating with transceiver 16 over communication link 36 in a narrow band mode. As described in relation to the system of FIG. 1, controller 18 operates to send control signals to user terminal 24 to direct whether it communicates in a narrow or wide band mode of operation. Whether controller 18 sends control signals to user terminal 24 to direct it to communicate in a wide band mode depends, in part, upon whether user terminal is a mobile station or another type of communication device.

Continuing to refer to system 100 of FIG. 2, user terminal 24 is also operable to communicate with LES 12 over communication link 46 in a wide band mode of operation. LES 12 receives the communication signals from user terminal 12 and transmits the same signals to transceiver 16 over communication link 34 also in a wide band mode of operation. Transceiver 16, in turn, transceives the received signals to another user terminal or to another land earth station. By way of example, transceiver 16 transmits the communication signals received from LES 12 to LES 50 if, by way of example, the termination point of the communication link is mobile station 42. As may be seen, LES 50 transmits the received signals to MSC 30 which transmits them to BS 40. BS 40 transmits the signals to MS 42. By using matching carrier signals in terms of bandwidth in communication links 46 and 34, timing problems of the transmissions by LES 12 are simplified and overall communication efficiency is improved.

From examining system 100 of FIG. 2, it may be seen that user terminal 24 is operable to communicate with BS 38, LES 12, and transceiver 16 all in a wide band mode (200 kilohertz). Additionally, user terminal 24 is also capable of communicating with transceiver 16 in a narrow band mode of operation (50 kilohertz or less). Accordingly, controller 18 is operable to send control signals to user terminal 24 specifying the mode of communication in communication link 36. Additionally, as may be seen, there are multiple communication paths shown for which user terminal 24 may use to establish a communication link. The multiple communication paths are shown to illustrate the variety of options. In practice however, it is expected that certain paths are preferred over others. The path which is used, therefore, is a function of actual availability.

To illustrate, if a communication link 44 may be established with BS 38, user terminal 24 will operate as a mobile station and will seek to establish a wide band communication link 44 with BS 38. If user terminal is seeking to place a call to mobile station 42, therefore, a communication path is established through MSC 28, PSTN 32, MSC 30, and BS 40 to reach mobile station 42. If, however, BS 38 is too far away to establish communication link 44, user terminal is operable to attempt to establish wide band communication link 46 with LES 12. LES 12 is then operable to relay communication signals received from user terminal 24 to transceiver 16 over wide band communication link 34. Transceiver 16 then transceives the received communication signals to LES 50 over communication link 48. LES 50 is then operable to transmit the communication signals to MSC 30, BS 40 and finally to MS 42 to create the communication path from user terminal 24 to mobile station 42.

As a final example, if user terminal is too far from LES 12 to establish communication link 46, it seeks to establish communication link 36 with transceiver 16. Whether communication link 36 is established as a wide band or narrow band communication link depends upon factors such as whether user terminal 24 is a hand held device such as a mobile station and upon the control signals received from controller 18 over a control channel transmitted through communication link 36. Call set up through control channels over communication link 36 is well known to those skilled in the art and will not be explained herein. Accordingly, user terminal transmits control signals to transceiver 16 over a control channel within communication link 36. Transceiver 16 then communicates with controller 18 over control channels in communication path 23 to indicate that user terminal seeks a communication channel. Controller 18 then analyzes channel usage and also examines the type of device requesting a channel. In response thereto, controller 18 transmits control signals back to user terminal 24 through transceiver 16 specifying the channel and whether user terminal is to transmit in a wide band or narrow band mode.

Although one or more embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A communication network system, comprising:
    a satellite transceiver for receiving and transmitting communication signals;
    a communication device for terminating a call transceived by said satellite transceiver;
    a user terminal for originating a two way communication and for transmitting to said satellite transceiver communication signals, selectably in response to mode control signals, in one of a wide band mode or in a narrow band mode; and
    a controller, remotely located from the user terminal, for transmitting mode control signals, to said user terminal, the mode control signals specifying whether said user terminal is to transmit the communication signals in a wide band or in a narrow band.

2. In a cellular communication network system having a satellite based transceiver, a user terminal for engaging in two-way communications and for transmitting an uplink signal formed of a selectable frequency bandwidth through a satellite based transceiver to a receiving station, and a controller for allocating a communication channel upon which to transmit the uplink signal, an improvement for the controller circuitry for providing the user terminal with the selected frequency bandwidth of which the uplink signal is to be formed, said circuitry comprising:
    a communication indicia receiver for receiving indications of at least indicia of communications by the user terminal remotely located from the controller circuitry upon the communication channel allocated by the controller;
    a selector operably responsive to the indications received by said communication indicia receiver, said selector for selecting the frequency bandwidth of the uplink signal to be transmitted by the user terminal; and
    a transmitter for transmitting indications of the frequency bandwidth selected by the selector to the remotely located user terminal as a mode signal within control signals transmitted to the user terminal.

3. The cellular communication network system of claim 2 wherein the remotely located user terminal is operable to transmit in an uplink in one of a narrow band mode or a wide band mode in response to the mode signal.

4. The cellular communication network system of claim 3 wherein the controller is operable to transmit control signals to the user terminal specifying whether the user terminal transmits in one of a wide band or narrow band mode.

5. A communication network system, comprising:
    a user terminal for originating a two-way communication, said user terminal for transmitting in an uplink in a wide band mode and in a narrow band mode;
    a satellite transceiver; and
    a controller remotely located from the user terminal for transmitting control signals to said user terminal, the control signals specifying within said user terminal is to transmit the communication signals in a wideband or in a narrowband via a mode control signal within the control signals.

6. A method for setting up a two-way communication link through a satellite transceiver, the communication originating at a user terminal and terminating at a communication device, the method including the steps of:
    transmitting from the user terminal to a controller remotely located from the user terminal a request for a communication channel; and
    receiving the request for a communication channel and transmitting, in response thereto, control signals from the controller to said user terminal, the control signals including a mode signal, the mode signal for specifying one of a wide band mode or a narrow band mode of operation for the uplink from the user terminal to the satellite transceiver.

\* \* \* \* \*

UNITED STATES PATENT AND TRADEMARK OFFICE
CERTIFICATE OF CORRECTION

PATENT NO.    : 5,914,942
DATED         : June 22, 1999
INVENTOR(S)   : Hassan et al.

It is certified that error appears in the above-identified patent and that said Letters Patent is hereby corrected as shown below:

<u>Column 4,</u>
Line 4, after "Additionally," delete -- S --

Signed and Sealed this

Thirtieth Day of October, 2001

Attest:

*Attesting Officer*

NICHOLAS P. GODICI
*Acting Director of the United States Patent and Trademark Office*